May 24, 1949.  N. J. PEPIN  2,471,120
MOTOR MOUNTING ATTACHMENT
Filed Nov. 29, 1944
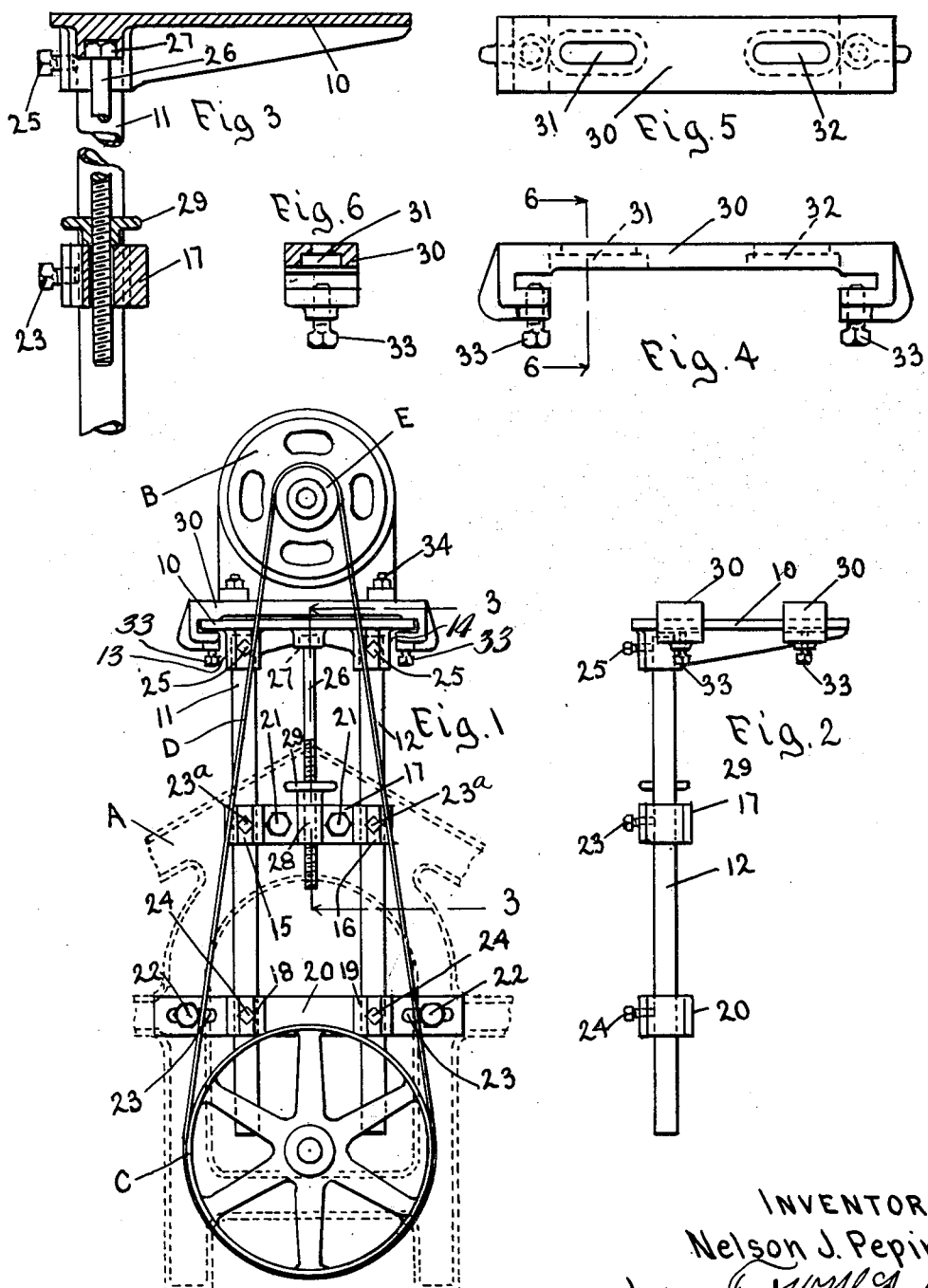
INVENTOR
Nelson J. Pepin
by Fred W McArdle
atty Patented May 24, 1949

2,471,120

UNITED STATES PATENT OFFICE 2,471,120

MOTOR MOUNTING ATTACHMENT

Nelson J. Pepin, Lowell, Mass.

Application November 29, 1944, Serial No. 565,705

2 Claims. (Cl. 248—23)

My invention relates to mountings for electric motors and particularly to such mountings attachable to the frames of machines designed to be operated from power plant installations.

In many mills and factories it has been found desirable to equip some of the machines of this character with direct motor drive, and in such circumstances the installation of a motor requires additional floor space or a material alteration or addition to the frame of the machine.

My invention obviates these difficulties in addition to providing an efficient and compact installation, which may be attached to the machine frame of the machine with little labor and without change in the frame other than a few bolt holes, the mounting being an assembled unit which may be readily attached to the machine frame. When thus attached, means are provided whereby motors of varied capacity or model may be mounted and adjusted to align with the main pulley of the machine, with other means for taking up the slack in the belt connecting the motor pulley with said main pulley, all without drilling or other machine work.

This mounting is especially adapted for use in textile mills and other factories where floor space is a prime consideration.

One object of my invention is to provide a motor mounting attachable to the frame of a machine in operative relation to the driving pulley of the machine.

A second object is to provide a motor mounting that may be installed on a variety of machines without alteration or addition to the frame other than a few bolt holes.

A further object is to provide a motor mounting of this character with means for mounting motors of a variety of models or capacity, which may be adjusted to operative position without additional drilling for fastening the motor to the mounting.

Other advantages and novelties will appear in the accompanying specification and claims and in the drawings forming a part thereof. My invention consists in the novel construction and combination of elements to attain my objects.

In the drawings,

Fig. 1 is an elevation showing a preferred embodiment of my invention as installed on the frame of a machine used in a textile mill, the essential portion of the machine frame being shown in dotted lines.

Fig. 2 is a side elevation of the mounting.

Fig. 3 is an enlarged sectional fragment on the line 3—3, Fig. 1, showing means for adjustment for belt tension.

Fig. 4 is an enlarged side elevation of the adjustable skids to which the motor may be attached.

Fig. 5 is a plan of the same.

Fig. 6 is a sectional end view on the line 6—6, Fig. 4.

Referring to the drawings,

A is a portion of a machine frame to which the motor mounting is attached; B is an electric motor, installed in operative relation to the driving pulley C of the machine. D is a belt connecting the motor pulley E and the pulley C.

The motor mounting comprises a platen 10, posts 11, 12 rigid with the hubs 13, 14 integral with the platen 10, the posts extending downwardly in parallel relation, and slidable in the hubs 15, 16 formed on the supporting element 17, and the hubs 18, 19 formed on the supporting element 20, the supporting elements being bolted to the frame A by bolts 21, 22.

The supporting element 20 is formed with slots 23, permitting variation of the distance between the bolts 21, 22 according to the upright members of different frames, and also to permit vertical alignment relative to the supporting element 17.

Set screws 23a in hubs 15, 16, and 24 in hubs 18, 19 provide for securing the posts in adjusted position.

Set screws 25 in hubs 13, 14 permit disassembling of the posts and platen for convenience in shipping.

The posts 11, 12, rigid with the platen 10, are adjustable axially in their bearings by the following means: The element 26 is socketed in the platen at 27, and extends downwardly in parallel relation to the posts, slidable in the hub 28 in the supporting element 17. This element 26, is threaded and the hand wheel 29 is tapped to engage therewith, bearing on the hub 28.

By this means the platen 10 may be raised or lowered to provide proper tension on the belt D after the motor is mounted.

The motor is mounted on the skids 30 which are slidable laterally on the platen 10. These skids are slotted at 31, 32 and when the motor is mounted, the distance between bolt holes in the motor may vary according to the model. By means of these slots, the holes may be aligned therewith in one direction, and the skids may be moved on the platen to align the holes in the other direction. By means of T-head bolts inserted through the slots 31, 32 before assembling with the platen, the motor may be secured to the skids. The slots and the movable skids also provide means for varying within limits, the position of the motor relative to the platen, and motors of varied model and capacity may be mounted in this way without any drilling. When the motor is finally adjusted, set screws 33 may be tightened on the platen to secure the skids rigid with the platen, and the motor in adjusted lateral position. The tension on the belt may then be adjusted and the installation is complete.

While I have described and illustrated a preferred form, modifications within the scope of the appended claims may be made according to conditions and machine frames to which the mounting may be attached.

Having thus described my invention, I claim:

1. Mechanism for supporting a driving motor in such position above a shaft to be driven that a belt and pulley driving connection between motor and shaft may be maintained, said mechanism, including a platen, means for supporting the platen at a suitable elevation, said means being adjustable so that the platen may be moved vertically to a desired position and locked in said position, and means associated with the platen for facilitating the attachment to said platen of a motor base, said last mentioned means including elongated skids disposed in parallel relationship and slidably resting upon the upper surface of said platen so as to be bodily movable toward and away from each other, the end of each skid extending around the adjacent terminal edge of the platen and terminating beneath the platen and each skid having formed therein two spaced bolt receiving slots extending in directions transverse to the direction in which the skids may be bodily moved, bolts extending upwardly through said slots, respectively, and movable longitudinally therein and elements attached to the terminal ends of said skids, respectively, for securing said skids against movement relatively to each other and relatively to said platen, said elements being adapted to be brought into engagement with the undersurface of said platen.

2. Mechanism for supporting a driving motor in such position above a shaft to be driven that a belt and pulley driving connection between motor and shaft may be maintained, said mechanism, including a platen, means for supporting the platen at a suitable elevation, said means being adjustable so that the platen may be moved vertically to a desired position and locked in said position, and means associated with the platen for facilitating the attachment to said platen of a motor base, said last mentioned means including elongated skids disposed in parallel relationship and slidably resting upon the upper surface of said platen so as to be bodily movable toward and away from each other, the end of each skid extending around the adjacent terminal edge of the platen and terminating beneath the platen and each skid having formed therein two spaced bolt receiving slots extending in directions transverse to the direction in which the skids may be bodily moved, bolts extending upwardly through said slots, respectively, and movable longitudinally therein and a screw attached to the terminal end of each skid and adapted to be brought into engagement with the undersurface of said platen.

NELSON J. PEPIN.

REFERENCES CITED

The following references are of record in the file of this patent:

UNITED STATES PATENTS

| Number | Name | Date |
|---|---|---|
| 434,011 | Wrigley | Aug. 12, 1890 |
| 669,116 | Jones | Mar. 5, 1901 |
| 1,088,451 | Rilance | Feb. 24, 1914 |
| 1,211,352 | Rathburn | Jan. 2, 1917 |
| 1,227,292 | Mills | May 22, 1917 |
| 1,272,866 | Shorb | July 16, 1918 |
| 1,285,628 | Craley | Nov. 26, 1918 |
| 1,453,416 | Stanley | May 1, 1923 |
| 1,488,617 | Robinson | Apr. 1, 1924 |
| 1,878,983 | Harris | Sept. 20, 1932 |
| 2,224,813 | Geer | Dec. 10, 1940 |
| 2,370,048 | Koch | Feb. 20, 1945 |

FOREIGN PATENTS

| Number | Country | Date |
|---|---|---|
| 474,900 | Germany | Apr. 15, 1929 |